Nov. 16, 1965  R. T. CATLIN  3,218,057
TOOL CLAMPING MEANS
Filed June 26, 1962  2 Sheets-Sheet 2
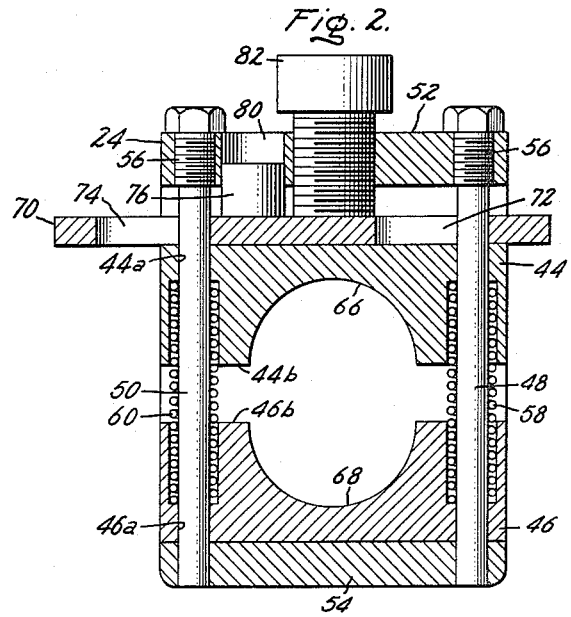
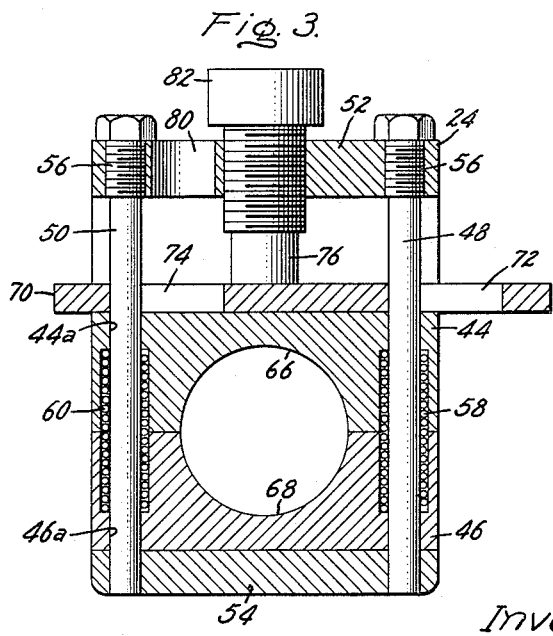
Inventor:
Robert T. Catlin,
by John H. Lewis Jr.
John W. Phipps
Nicholas Skovran
His Attorneys.

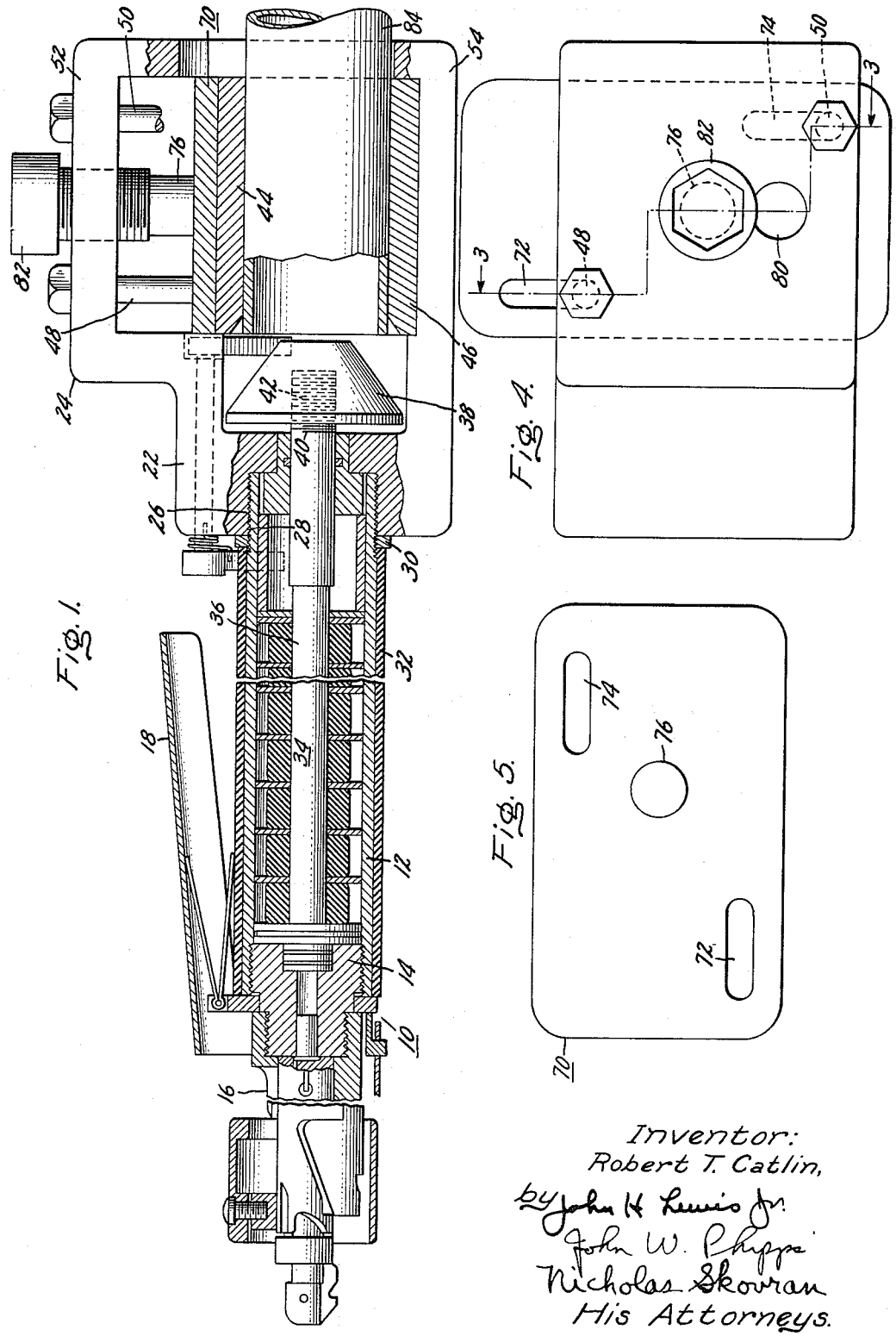

3,218,057
TOOL CLAMPING MEANS
Robert T. Catlin, Trumbull, Conn., assignor to Remington Arms Company, Inc., Bridgeport, Conn., a corporation of Delaware
Filed June 26, 1962, Ser. No. 205,441
11 Claims. (Cl. 269—165)

This invention relates in general to clamping means mounted on the end of a tool which is used to hold a workpiece while work is performed on the workpiece by the tool.

More specifically, the invention relates to a quick-release clamping means mounted on the end of an explosively-actuated tool which clamps a tube in place while the end portion of the tube is flared by the tool.

Although the present invention is disclosed in combination with a tube flaring tool, it should be appreciated that the clamping means can also be used in other tools as well where it is necessary to secure a workpiece.

The use of explosively-actuated tools as tube or pipe flarers is not new and can be seen, for example, in the Catlin et al. copending application, Serial Number 48,764, filed on August 10, 1960, now Patent No. 3,126,630. FIGURE 36 of the copending case shows a clamping means mounted on the end of a tube flarer. The present invention is an improvement on this device.

A deficiency in many of the prior art tube flarers is that a considerable amount of time is expended in releasing the clamp, removing the flared tube, inserting a new tube, and then tightening the new tube in place to be flared. It is apparent that if there is to be any speeding up of this operation, one of the first areas to investigate is a quick-release clamping means.

It is an object of this invention to provide a simple and rugged clamping means mounted on a frame which can be quickly released from a workpiece to permit removal of the workpiece therefrom and also quickly tightened about a newly inserted workpiece.

It is a further object of this invention to provide a clamping means having a laterally movable spacer which materially decreases the amount of tightening or loosening which is necessary to hold or release the workpiece.

FIGURE 1 shows an explosive-actuated tube flarer with the quick-release clamping means mounted thereon.

FIGURE 2 shows the clamping means in an inoperative position.

FIGURE 3 shows the clamping means in an operative position.

FIGURE 4 is a plan view of the tube clamping jig.

FIGURE 5 is a plan view of the spacer plate.

Referring to the drawings, wherein is shown for purposes of illustration one embodiment of the invention, the tool 10 has a barrel section 12 enclosed at its breech end by barrel closure member 14, an enclosed receiver section 16 in which is mounted the bolt firing mechanism of the tool, and a preferred hand pressure actuated trigger mechanism including the trigger lever 18 disposed along the barrel section.

The other end of the barrel section 12, towards muzzle end of the tool, is enclosed by the head member or housing generally indicated by numeral 22, which includes a tube clamping assembly or jig 24. The tube clamping jig 24 is conveniently and removably attached to the barrel section 12, such as by appropriate internal threads 26 engaging external threads 28 of the barrel section 12. The lock nut 30 locks the engagement and also holds the hand grip 32 in place.

The punching instrument, generally indicated by numeral 34, is formed by the piston rod 36 and a cone-shaped flare punching instrumentality 38 which is attached, as by threads 40, to the end 42 thereof.

A more detailed description of the environment in which the novel quick-acting clamp is used is found in the above cited copending application Serial Number 48,764.

The clamping assembly comprises a pair of dies or jaws 44 and 46 having openings 44a and 46a therin to permit the jaws to be slidably mounted on vertically positioned guide rods 48 and 50. Lower jaw 46 functions as a work support means and upper jaw 44 acts as a clamp means, as will be explained below. It can be seen from FIGURE 4 that the guide rods are parallel and laterally offset from one another. Although shown in FIGURES 2 and 3 as extending through upper and lower frame portions 52 and 54 of the tube clamping jig 24, the guide rods also can be mounted as shown in FIGURE 37 of copending application Serial Number 48,764. In the present application the guide rods are securely positioned on the upper frame portion 52 by a threaded upper portion 56 of the guide rods.

Coil spring 58 and 60 are are positioned in adjacent openings 44a and 46a which have been enlarged at 62 and 64 in order to accommodate the springs. The springs 58 and 60 are in compression and are adapted to bias the jaws away from each other. Cut into the adjacent, inner faces 44b and 46b of the jaw members 44 and 46 are semi-circular notches 66 and 68 in which the tube 84 to be flared is placed.

A spacer means 70, comprised of a plate or some other appropriate element and having elongated laterally offset slot means 72 and 74 in which guide rods 48 and 50 are placed, is slidably mounted on the guide rods intermediate the upper jaw member 44 and the upper frame portion 52 (see FIGURES 3 and 5). As can be seen in FIGURES 2 and 3, the slots 72 and 74 permit movement of the spacer 70 from a non-clamping position (FIGURE 2) where a stud element 76, formed integrally on the upper face 78 of spacer 70, is positioned in an opening 80 in the upper frame portion 52 to a clamping position (FIGURE 3) where the spacer 70 is moved axially and transversely to position the stud 76 directly beneath a thread clamp screw or adjusting means 82. Slots 72 and 74 are so arranged that the ends of the slots act as limiting means to accurately position the stud 76 under screw 82 at one limit of transverse movement and in alignment with the opening 80 at the opposite limit of transverse movement. There is no guessing or fumbling to locate the stud 76 in the correct position.

As the spacer 70 is moved axially in order to remove the stud 76 out of the opening 80 so that the spacer can be moved transversely to position the stud under screw 82, it also moves the upper jaw 44 downwardly against the bias of coil springs 58 and 60 until the faces 44b and 46b are in abutting engagement and a tube 84 placed in notches 66 and 68 is substantially clamped in place. A slight tightening of screw 82 will then securely clamp the tube 84 in place.

It will be appreciated that clamp screw 82 can be previously set to extend a predetermined distance into the frame (depending on the size tubing to be flared) so that a minimum amount of final tightening is necessary.

It should also be notched that although lower jaw 46 is shown as being slidable on the guide rods, it can be secured to the frame without affecting the operation of the quick-release clamp means. Of course, other modifications and slight changes can be made such as having the lower jaw integral with the lower frame portion.

What is claimed is:

1. A quick-release clamp comprising a frame having a work support means thereon, clamping means slidably mounted on said frame, means to bias said clamping means away from said support means, an adjustable tightening means mounted on said frame, and spacer means positioned between said tightening means and said clamp means, an abutment on said spacer means, said spacer means adapted to move axially and laterally relative to said frame to effect an abutting engagement of said tightening means with said abutment whereby said clamping means can be quickly brought into clamping position by a relatively small amount of actuation of said tightening means.

2. In a clamping device for a flaring tool, said clamping device including a housing, a work support means thereon, guide means in said housing, clamping means slidable on said guide means and cooperating with said work support means to hold a workpiece therebetween, adjusting means on said housing adapted to force said clamping means into clamping position, spacer means positioned between said adjusting means and said clamping means adapted to transfer the clamping force from said adjusting means to said clamping means, means on said spacer means cooperating with said guide means and said adjusting means to permit axial and transverse movement of said spacer means relative to said housing to permit quick release of said clamping means from said workpiece.

3. A device as recited in claim 2 in which said spacer means includes an upwardly projecting stud elongated slot means in said spacer means extending laterally of said elongated rods in which said rods are positioned, said spacer means being movable from a lower clamping position in which said spacer means abuts said clamping means and said stud abuts said adjusting means to an upper non-clamping position in which said spacer means and stud move laterally and upwardly to position said stud in an opening in said housing.

4. A tool clamping means having a housing at one and thereof, guide means in said housing, clamping means slidably mounted on said guide means, adjustable means projecting downwardly from the top of said housing, spacer means having upwardly projecting means thereon positioned between said clamping means and said downwardly projecting means, said spacer means being so constructed as to be axially and laterally movable to position said upwardly projecting means in abutting engagement with said downwardly projecting means whereupon said clamping means is moved to clamping position upon a relative slight movement of said adjustable downwardly projecting means.

5. A tool clamping means as recited in claim 4 wherein said spacer means includes a spacer plate laterally movable in said housing, said upwardly projecting means comprises a stud on said spacer plate, and means to limit the lateral movement of said spacer plate in either direction in said housing.

6. A tool clamping means as recited in claim 5 wherein said guide means includes a plurality of elongated rods in said housing, said spacer plate having elongated slots in which said rods are positioned so that said spacer plate is free to move axially and laterally of said rods, said limit means comprising the closed ends of said slots.

7. A tool clamping means as recited in claim 6 in which biasing means are provided to bias said clamping means into non-clamping position.

8. A tool clamping means as provided in claim in which said downwardly projecting adjustable means comprises a screw threadedly mounted on said housing.

9. A clamping assembly comprising a frame, guide means on said frame, support means supported within said frame, clamping means slidably mounted on said guide means, means to bias said clamping means away from said support means, spacer means slidably guided on said guide means for axial movement thereof, said spacer means and an abutment thereon being adapted to move a predetermined distance transversely of said guide means, and tightening means to abut said spacer abutment means and operable to force said spacer means and said clamping means downwardly into clamping position.

10. An assembly as recited in claim 9 wherein said spacer means comprises a spacer plate with elongated slot means therein in which said guide means are positioned, the closed ends of said slots limiting lateral movement of said spacer plate relative to said guide means.

11. An assembly as recited in claim 9 in which said tightening means comprises a threaded screw operably mounted in said housing.

References Cited by the Examiner
UNITED STATES PATENTS

| | | | |
|---|---|---|---|
| 1,827,258 | 10/1931 | Payzant | 269—157 X |
| 2,843,924 | 7/1958 | Franck | 269—288 X |
| 2,865,591 | 12/1958 | Holinshead | 269—287 X |

ROBERT C. RIORDON, *Primary Examiner.*